United States Patent
Deng et al.

(10) Patent No.: US 11,659,526 B2
(45) Date of Patent: May 23, 2023

(54) METHOD AND DEVICE FOR PROCESSING DATA

(71) Applicant: Yulong Computer Telecommunication Scientific (Shenzhen) Co., Ltd., Guangdong (CN)

(72) Inventors: Yiwei Deng, Guangdong (CN); Mingju Li, Guangdong (CN); Yunfei Zhang, Guangdong (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 367 days.

(21) Appl. No.: 16/676,015

(22) Filed: Nov. 6, 2019

(65) Prior Publication Data

US 2020/0077392 A1    Mar. 5, 2020

Related U.S. Application Data

(63) Continuation of application No. PCT/CN2018/074154, filed on Jan. 25, 2018.

(30) Foreign Application Priority Data

May 9, 2017   (CN) .......................... 201710323109.2

(51) Int. Cl.
*H04W 72/04*      (2023.01)
*H04W 72/0446*    (2023.01)
(Continued)

(52) U.S. Cl.
CPC ....... *H04W 72/0446* (2013.01); *H04W 72/23* (2023.01); *H04W 72/29* (2023.01); *H04W 72/563* (2023.01)

(58) Field of Classification Search
CPC ........... H04W 72/0446; H04W 72/042; H04W 72/0433; H04W 72/06
See application file for complete search history.

(56) References Cited

U.S. PATENT DOCUMENTS

2013/0242926 A1   9/2013  Prasad et al.
2018/0070341 A1 * 3/2018  Islam .................... H04L 1/1887
(Continued)

FOREIGN PATENT DOCUMENTS

CN         105979597 A      9/2016
CN         106102180 A      11/2016
(Continued)

OTHER PUBLICATIONS

3GPP TSG RAN WG1 meeting #89; Hangzhou, P.R. China May 15-19, 2017; R1-1707710.
(Continued)

*Primary Examiner* — Rhonda L Murphy
(74) *Attorney, Agent, or Firm* — Young Basile Hanlon & MacFarlane, P.C.

(57) ABSTRACT

A method and a device for processing data are provided according to embodiments of the present disclosure. The method is carried out as follows. A terminal acquires indication information sent by a base station, the indication information is indicative of information of second time-frequency resources, and the second time-frequency resources are part of first time-frequency resources scheduled to the terminal and are allocated by the base station to other terminals. The terminal decodes data transmitted in resources in the first time-frequency resources other than the second time-frequency resources according to the indication information.

15 Claims, 5 Drawing Sheets

(51) Int. Cl.
*H04W 72/23* (2023.01)
*H04W 72/29* (2023.01)
*H04W 72/563* (2023.01)

(56) References Cited

U.S. PATENT DOCUMENTS

2019/0037550 A1* 1/2019 Zhang .................. H04L 5/0044
2019/0274153 A1* 9/2019 Park ...................... H04W 76/27
2019/0349960 A1* 11/2019 Li ...................... H04W 72/1242

FOREIGN PATENT DOCUMENTS

| CN | 106455081 A | 2/2017 |
| CN | 106455103 A | 2/2017 |
| CN | 106465319 A | 2/2017 |
| CN | 106941723 A | 7/2017 |
| CN | 106941724 A | 7/2017 |
| EP | 3476169 A1 | 5/2019 |
| EP | 3491871 A1 | 6/2019 |
| WO | 2018064360 A1 | 4/2018 |

OTHER PUBLICATIONS

3GPP TSG RAN WG1 Meeting #88; Athens, Greece Feb. 13-17, 2017; R1-1701963.
3GPP TSG RAN WG1 Meeting #88bis; Spokane, USA, Apr. 3-7, 2017; R1-1705753.
Extended European Search Report for EP Application 18797733.5 dated Dec. 14, 2020.
"Discussion on Preemption Indicator Design", Fujitsu, <<3GPP TSG-RAN WG1 Meeting#89 R1-1707261>>, pp. 1-5, May 5, 2017.
International Search Report for PCT/CN2018/074154, dated Mar. 22, 2018.

* cited by examiner

METHOD AND DEVICE FOR PROCESSING DATA

CROSS-REFERENCE TO RELATED APPLICATION(S)

This application is a continuation of PCT application No. PCT/CN2018/074154, filed on Jan. 25, 2018, which claims priority to Chinese Patent Application No. 201710323109.2, filed on May 9, 2017, the disclosures of both of which are hereby incorporated by reference in their entireties.

TECHNICAL FIELD

The present disclosure relates to the field of communication technology, and particularly to a method and a device for processing data.

BACKGROUND

With the rapid development of mobile services, research on the fifth-generation communication technologies has been vigorously carried out in academia and industry. The fifth generation technology needs to support ultra-high data transmission rates, massive number of connections, and lower data transmission delays, so as to meet requirements of different scenarios.

In new radio (NR) technology, since multiple types of services such as enhanced mobile broadband (eMBB) and ultra-reliable low latency communications (URLLC) need to be supported simultaneously, diversity multiplexing of the multiple types of services is required. In order to improve resource usage efficiency and meet the delay requirements of the URLLC service, the $3^{rd}$ generation partnership project (3GPP) has agreed on that a URLLC user equipment (UE) can occupy resources scheduled to an eMBB UE. However, when eMBB resources are occupied by the URLLC UE, the eMBB UE is unaware of information of the resources occupied by the URLLC UE, and thus affecting the efficiency and accuracy of data demodulation.

SUMMARY

A method and a device for processing data are provided according to embodiments of the present disclosure to solve at least the following problems. After time-frequency resources are scheduled to a terminal by a base station, the base station allocates part of the time-frequency resources to other terminals, so as to improve resource usage efficiency and meet delay requirements of other terminals. However, the terminal is unaware of information of time-frequency resources occupied by other terminals, resulting in lower efficiency and accuracy of data demodulation.

According to a first aspect of the present disclosure, a method for processing data is provided, and the method is carried out as follows.

A terminal acquires indication information sent by a base station. The indication information is indicative of information of second time-frequency resources, and the second time-frequency resources are part of first time-frequency resources scheduled to the terminal and are allocated by the base station to other terminals. The terminal decodes data transmitted in resources in the first time-frequency resources other than the second time-frequency resources according to the indication information.

In a first implementation according to the first aspect of the embodiments of the present disclosure, when the indication information is located in a symbol where a control channel of a transmission time interval (TTI) of the second time-frequency resources is located, the terminal acquires the indication information sent by the base station as follows. The terminal acquires the indication information from the symbol where the control channel of the TTI of the second time-frequency resources is located. When the indication information is located in control channels of N number of TTIs following a TTI of the first time-frequency resources, the terminal acquires the indication information sent by the base station as follows. The terminal acquires the indication information from the control channels of the N number of TTIs following the TTI of the first time-frequency resources, and N is an integer greater than or equal to one.

In a second implementation according to the first implementation of the first aspect of the embodiments of the present disclosure or to the first aspect as such, the method further includes the following prior to acquiring, by the terminal, the indication information sent by the base station. The terminal receives radio resource control (RRC) signaling sent by the base station, and the RRC signaling is used for instructing the terminal to acquire the indication information from one of control channels of N number of TTIs following a TTI of the first time-frequency resources and a symbol where a control channel of a TTI of the second time-frequency resources is located.

In a third implementation according to any of the preceding implementations of the first aspect of the embodiments of the present disclosure or to the first aspect as such, a time-domain granularity of the indication information is in a mini-slot level or a symbol level.

In a fourth implementation according to the third implementation of the first aspect of the embodiments of the present disclosure, the time-domain granularity of the indication information is in the mini-slot level when the second time-frequency resources have a length greater than or equal to two symbols in time domain, and the time-domain granularity of the indication information is in the symbol level when the second time-frequency resources have a length equal to one symbol in the time domain.

According to a second aspect of the present disclosure, a method for processing data is provided, and the method is carried out as follows. A base station allocates second time-frequency resources, which are part of first time-frequency resources scheduled to a terminal, to other terminals. The base station generates indication information according to the second time-frequency resources, and the indication information is used for instructing the terminal to identify information of the second time-frequency resources. The base station sends the indication information to the terminal.

In a first implementation according to the second aspect of the embodiments of the present disclosure, when the indication information is located in a symbol where a control channel of a transmission time interval (TTI) of the second time-frequency resources is located, the indication information is sent to the terminal by carrying the indication information into downlink control information (DCI). When the indication information is located in control channels of N number of TTIs following a TTI of the first time-frequency resources, the indication information is sent over one of a new radio physical downlink control channel (NR-PDCCH) and a group common physical downlink control channel (GC-PDCCH), and N is an integer greater than or equal to one.

In a second implementation according to the first implementation of the second aspect of the embodiments of the present disclosure or to the second aspect as such, the method further includes the following. The base station sends radio resource control (RRC) signaling to the terminal, and the RRC signaling is used for instructing the terminal to acquire the indication information from one of control channels of N number of TTIs following a TTI of the first time-frequency resources and a symbol where a control channel of a TTI of the second time-frequency resources is located.

In a third implementation according to the first implementation of the second aspect of the embodiments of the present disclosure, the base station sends the indication information to the terminal as follows. When the terminal supports services of the other terminals, the base station sends the indication information over one of the symbol where the control channel of the TTI of the second time-frequency resources is located and the control channels of the N number of TTIs following the TTI of the first time-frequency resources. When the terminal fails to support the services of the other terminals, the base station sends the indication information over the control channels of the N number of TTIs following the TTI of the first time-frequency resources.

In a fourth implementation according to the first implementation of the second aspect of the embodiments of the present disclosure, the base station sends the indication information to the terminal as follows. When a service level of a service performed by the terminal is greater than or equal to a level threshold, the base station sends the indication information over the symbol where the control channel of the TTI of the second time-frequency resources is located. When the service level of the service performed by the terminal is less than the level threshold, the base station sends the indication information over one of the symbol where the control channel of the TTI of the second time-frequency resources is located and the control channels of the last N number of TTIs of the first time-frequency resources. A factor for determining the service level at least includes a delay requirement of performing the service by the terminal.

In a fifth implementation according to the first implementation of the second aspect of the embodiments of the present disclosure, the base station sends the indication information to the terminal as follows. A ratio of resources occupied by the second time-frequency resources to resources occupied by the first time-frequency resources is determined. When the ratio is less than or equal to an occupancy threshold, the base station sends the indication information over one of the symbol where the control channel of the TTI of the second time-frequency resources is located and the control channels of the N number of TTIs following the TTI of the first time-frequency resources. When the ratio is greater than the occupancy threshold, the base station sends the indication information over the control channels of the N number of TTIs following the TTI of the first time-frequency resources.

According to a third aspect of the present disclosure, a device for processing data is provided, and the device for processing data includes an acquiring module and a decoding module. The acquiring module is configured to acquire indication information sent by a base station, the indication information is indicative of information of second time-frequency resources, and the second time-frequency resources are part of first time-frequency resources scheduled to a terminal and are allocated by the base station to other terminals. The decoding module is configured to decode data transmitted in resources in the first time-frequency resources other than the second time-frequency resources according to the indication information.

According to a first implementation of the third aspect of the embodiments of the present disclosure, when the indication information is located in a symbol where a control channel of a transmission time interval (TTI) of the second time-frequency resources is located, the acquiring module is configured to acquire the indication information from the symbol where the control channel of the TTI of the second time-frequency resources is located. When the indication information is located in control channels of N number of TTIs following a TTI of the first time-frequency resources, the acquiring module is configured to acquire the indication information from the control channels of the N number of TTIs following the TTI of the first time-frequency resources, and N is an integer greater than or equal to one.

In a second implementation according to the first implementation of the third aspect of the embodiments of the present disclosure or the third aspect as such, the device further includes a receiving module. The receiving module is configured to receive radio resource control (RRC) signaling sent by the base station, and the RRC signaling is used for instructing the terminal to acquire the indication information from one of control channels of N numbers of TTIs following a TTI the first time-frequency resources and a symbol where a control channel of a TTI of the second time-frequency resources is located.

In a third implementation according to any of the preceding implementations of the third aspect of the embodiments of the present disclosure or to the third aspect as such, a level of a time-domain granularity of the indication information includes a mini-slot level and a symbol level.

In a fourth implementation according to the third implementation of the embodiments of the present disclosure, the time-domain granularity of the indication information is in the mini-slot level when the second time-frequency resources has a length greater than or equal to two symbols in time domain, and the time-domain granularity of the indication information is in the symbol level when the second time-frequency resources has a length equal to one symbol in the time domain.

According to a fourth aspect of the present disclosure, a device for processing data is provided. The device for processing data includes an indication information generating module and a first sending module. The indication information generating module is configured to allocate second time-frequency resources which are part of first time-frequency resources scheduled to a terminal to other terminals, and to generate indication information according to the second time-frequency resources, and the indication information is used for instructing the terminal to identify information of the second time-frequency resources. The first sending module is configured to send the indication information to the terminal.

In a first implementation according to the fourth aspect of the embodiments of the present disclosure, when the indication information is located in a symbol where a control channel of a transmission time interval (TTI) of the second time-frequency resources is located, the first sending module is configured to carry the indication information into downlink control information (DCI) and to send the indication information to the terminal. When the indication information is located in control channels of N number of TTIs following a TTI of the first time-frequency resources, the first sending module is configured to send the indication information to the terminal over one of a new radio interface physical downlink control channel (NR-PDCCH) and a group common downlink control channel group common (GC-PDCCH), and N is an integer greater than or equal to one.

In a second implementation according to the first implementation of the fourth aspect of the embodiments of the present disclosure or to the fourth aspect as such, the device further includes a second sending module. The second sending module is configured to send radio resource control (RRC) signaling to the terminal, and the RRC signaling is used for instructing the terminal to acquire the indication information from one of control channels of N number of TTIs following a TTI of the first time-frequency resources and a symbol where a control channel of a TTI of the second time-frequency resources is located.

In a third implementation according to the first implementation of the fourth aspect of the embodiments of the present disclosure, when the terminal supports services of the other terminals, the first sending module is configured to send the indication information over one of the symbol where the control channel of the TTI of the second time-frequency resources is located and the control channels of the N number of TTIs following the TTI of the first time-frequency resources. When the terminal fails to support the services of the other terminals, the first sending module is configured to send the indication information over the control channels of the N number of TTIs following the TTI of the first time-frequency resources.

In a fourth implementation according to the first implementation of the fourth aspect of the embodiments of the present disclosure, when a service level of a service performed by the terminal is greater than or equal to a level threshold, the first sending module is configured to send the indication information over the symbol where the control channel of the TTI of the second time-frequency resources is located. When the service level of the service performed by the terminal is less than the level threshold, the first sending module is configured to send the indication information over one of the symbol where the control channel of the TTI of the second time-frequency resources is located and the control channels of the last N number of TTIs of the first time-frequency resources. A factor for determining the service level at least includes a delay requirement of performing the service by the terminal.

In a fifth implementation according to the first implementation of the fourth aspect of the embodiments of the present disclosure, the first sending module is configured to determine a ratio of resources occupied by the second time-frequency resources to resources occupied by the first time-frequency resources. When the ratio is less than or equal to an occupancy threshold, the first sending module is configured to send the indication information over one of the symbol where the control channel of the TTI of the second time-frequency resources is located and the control channels of the N number of TTIs following the TTI of the first time-frequency resources. When the ratio is greater than the occupied threshold, the first sending module is configured to send the indication information over the control channels of the N number of TTIs following the TTI of the first time-frequency resources.

Beneficial effects of the embodiments of the present disclosure are described as follows. According to the method and the device for processing data as described above, when the terminal acquires the indication information sent by the base station, the terminal decodes data transmitted in resources in the first time-frequency resources other than the second time-frequency resources according to the indication information. The second time-frequency resources are part of first time-frequency resources scheduled to the terminal and are allocated by the base station to other terminals. That is, the terminal only decodes data for the terminal without decoding data for the other terminals, thereby improving the efficiency and accuracy of data demodulation.

BRIEF DESCRIPTION OF DRAWINGS

To describe the technical solutions in the embodiments of the present disclosure or in the related art more clearly, the following briefly introduces the accompanying drawings required for describing the embodiments or the related art. Apparently, the accompanying drawings in the following description illustrate some embodiments of the present disclosure. Those of ordinary skill in the art may also obtain other drawings based on these accompanying drawings without creative efforts.

DETAILED DESCRIPTION

Technical solutions in the embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

In the existing long term evolution (LTE) configuration, data transmission is performed in units of transport blocks (TB). The TB may include multiple code blocks (CB), and the CB is a basic unit for transmitting TB.

At present, main scenarios of the fifth generation (5G) communication include enhanced mobile broadband (eMBB), massive machine type communications (mMTC), and ultra-reliable low latency communications (URLLC). The three types of scenarios are for different types of services and have different requirements. For example, the eMBB service is mainly for a service scenario that requires a higher data rate, the mMTC service is mainly for a service scenario that requires massive number of connections, and the URLLC service is mainly for a service scenario that requires lower delay and high reliability.

Figure 1:
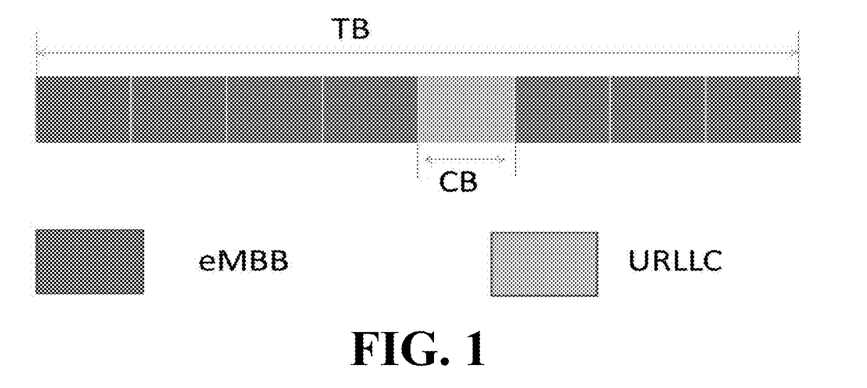
FIG. 1 is a schematic structural diagram of a transport block.

In new radio (NR) technology, since multiple types of services such as eMBB and URLLC need to be supported simultaneously, diversity multiplexing of the multiple types of services is required. To improve resource efficiency and meet the latency requirements of URLLC services, a phenomenon possibly caused by such diversity multiplexing is described below. N resource blocks (RBs) in one slot are allocated to eMBB UE #1, and a first device is configured to send data and control signal corresponding to UE #1 in slot 1. When a service of URLLC UE #2 suddenly arrived in a middle part of slot 1, resources are required to be immediately allocated to URLLC UE #2 in order to meet the latency requirements of URLLC service. Thus, it is possible that a part of symbols in a middle part of slot 1 is then allocated to URLLC UE #2, that is to say, part of or all of the N resource blocks will not transmit the data and control signal of eMBB UE #1 in the duration of this part of symbols (as illustrated in FIG. 1, one CB in a middle part of TB is allocated to URLLC UE #2), but instead transmit data and control signal of URLLC UE #2. However, when the URLLC UE occupies resources of eMBB, the eMBB UE #1 is unaware of information of the resources occupied by the URLLC UE, thus affecting the efficiency and accuracy of data demodulation.

In this embodiment, a terminal can be a personal computer, a server computer, a handheld or laptop, a consumer electronic device, a mobile device (such as a smart phone, a tablet, a media player, etc.), or a multi-processor system, etc., and of course, a base station. The embodiments of the present disclosure are not limited to the above terminal representation.

The present disclosure is not limited to services performed by the terminal and other terminals. In an embodiment, the terminal performs the eMBB service, and the other terminals perform the URLLC service. It is noted that the other terminals may have multiple terminals.

Figure 2:
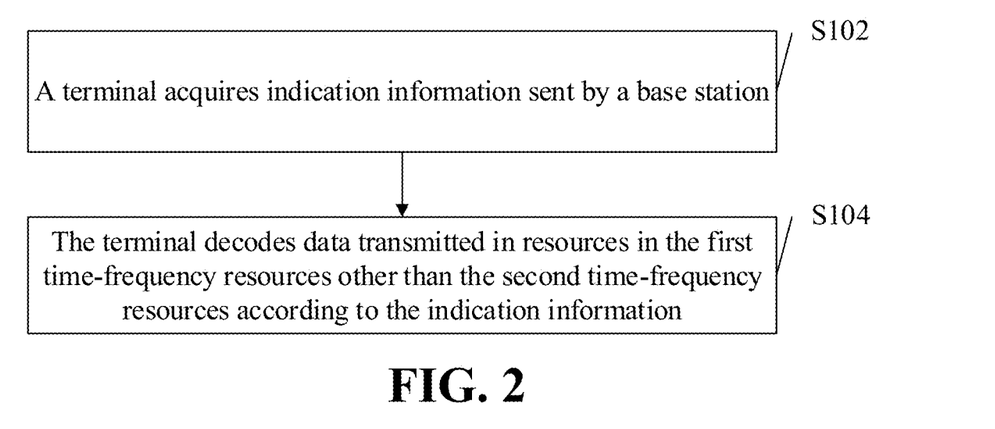
FIG. 2 is a schematic flow chart of a method for processing data according to an embodiment of the present disclosure.

According to a first aspect of the present disclosure, a method for processing data is provided to solve at least the following problems. After time-frequency resources are scheduled to a terminal by a base station, the base station allocates part of the time-frequency resources to other terminals, so as to improve resource usage efficiency and meet delay requirements of other terminals. However, the terminal is unaware of information of time-frequency resources occupied by other terminals, resulting in lower efficiency and accuracy of data demodulation. As illustrated in FIG. 2, a method for processing data begins with operations at S102.

At S102, a terminal acquires indication information sent by a base station.

In this implementation, the indication information is used for instructing the terminal to identify information of the second time-frequency resources. That is, the terminal obtains the information of the second time-frequency resources occupied by other terminals by acquiring the indication information. In this way, when data transmitted in the first time-frequency resources is demodulated, data corresponding to the second time-frequency resources is not be demodulated, thereby improving the efficiency and accuracy of data demodulation.

In this implementation, the second time-frequency resources are part of first time-frequency resources scheduled to the terminal and are allocated by the base station to other terminals. That is, in order to satisfy the multi-service multiplexing, the base station allocates part of the first time-frequency resources scheduled to the terminal to the other terminals and to be the second time-frequency resources. As illustrated in FIG. 1, the resources occupied by a URLLC service are configured as the second time-frequency resources.

In an implementation, when the indication information is located in a symbol where a control channel of a transmission time interval (TTI) of the second time-frequency resources is located, the terminal acquires the indication information sent by the base station as follows. The terminal acquires the indication information from the symbol where the control channel of the TTI of the second time-frequency resources is located. When the indication information is located in control channels of N number of TTIs following a TTI of the first time-frequency resources, the terminal acquires the indication information sent by the base station as follows. The terminal acquires the indication information from the control channels of the N number of TTIs following the TTI of the first time-frequency resources, and N is an integer greater than or equal to one.

In this implementation, the indication information may be located in the symbol where the control channel of the TTI of the second time-frequency resources is located, or in the control channels of the N number of TTIs following the TTI of the first time-frequency resources. That is, when the terminal receives control signaling and data sent by the base station, the terminal first needs to monitor a location of the indication information that may appear in the control channel, and then obtains the indication information after the location of the indication information is determined.

In an implementation, before the terminal acquires the indication information sent by the base station, the following is further carried out. The terminal receives radio resource control (RRC) signaling sent by the base station, and the RRC signaling is used for instructing the terminal to acquire the indication information from one of control channels of N number of TTIs following a TTI of the first time-frequency resources and a symbol where a control channel of a TTI of the second time-frequency resources is located.

That is, the terminal can obtain information of the location of the indication information according to the RRC signaling, thereby improving the efficiency of acquiring the indication information and reducing the power consumption of the terminal.

In an implementation, a time-domain granularity of the indication information is in a mini-slot level or a symbol level. That is, the time-domain granularity of the indication information may be in the mini-slot level, and alternatively, the time-domain granularity of the indication information may be in the symbol level. Since the time-domain granularity in the mini-slot level is greater than the time domain granularity in the symbol level, such that the flexibility of data decoding is further improved and power consumption is reduced.

In an implementation, when the second time-frequency resources have a length greater than or equal to two symbols in time domain, the time-domain granularity of the indication information is in the mini-slot level. When the second time-frequency resources have a length equal to one symbol in the time domain, the time-domain granularity of the indication information is in the symbol level.

That is, when the second time-frequency resources are greater than or equal to two symbols in the time domain, the indication information is transmitted with the time-domain granularity in the mini-slot level. When the second time-frequency resources have a length equal to one symbol in the time domain, the indication information is transmitted with the time-domain granularity in the symbol level. Since the time-domain granularity in the mini-slot level is greater than the time-domain granularity in the symbol level, signaling overhead is reduced.

For example, assume the TTI includes 7 symbols, and control information occupies one symbol. When the indication information is transmitted in the symbol level, 6 bits are occupied to be used for indicating, and a feedback character "0" means that it is not adopted and a feedback character "1" means that it is adopted. When the second time-frequency resources are two symbols in the time domain, the indication information is transmitted with the time domain granularity in the mini-slot level, and 5 bits are occupied to be used for indicating, thereby reducing signaling overhead.

At S104, the terminal decodes data transmitted in resources in the first time-frequency resources other than the second time-frequency resources according to the indication information.

This implementation does not limit specific data decoding processes.

Since the indication information includes the information of the second time-frequency resources, the terminal only needs to decode the data transmitted in the resources in the first time-frequency resources other than the second time-frequency resources when decoding data, and needs not to decode data transmitted in the second time-frequency resources, thereby improving the efficiency and accuracy of data demodulation.

Figure 3:
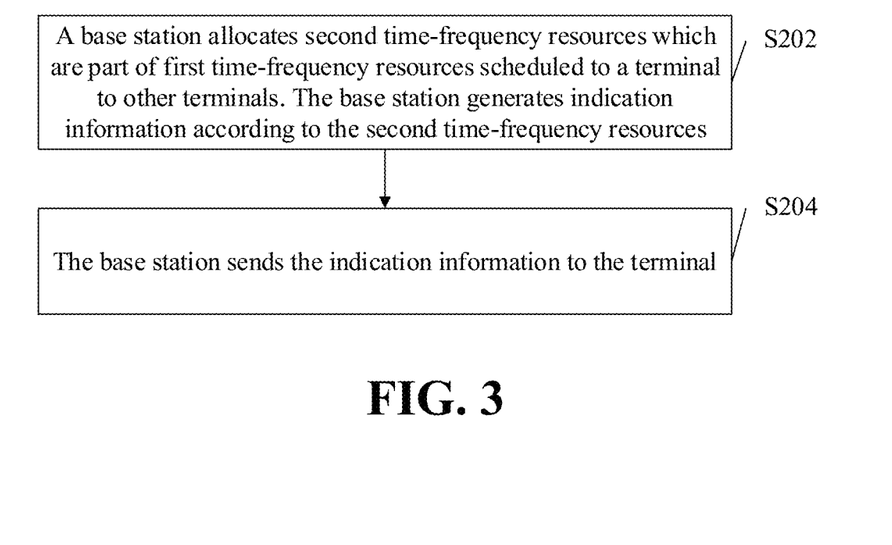
FIG. 3 is a schematic flow chart of a method for processing data according to another embodiment of the present disclosure.

According to a second aspect, a method for processing data is provided. As illustrated in FIG. 3, a method for processing data begins with operations at S202.

At S202, a base station allocates second time-frequency resources which are part of first time-frequency resources scheduled to a terminal to other terminals. The base station generates indication information according to the second time-frequency resources.

In this implementation, the second time-frequency resources are part of first time-frequency resources scheduled to the terminal and are allocated by the base station to other terminals. That is, in order to satisfy the multi-service multiplexing, the base station allocates part of the first time-frequency resources scheduled to the terminal to the other terminals and to be the second time-frequency resources. As illustrated in FIG. 1, the resources occupied by a URLLC service are configured as the second time-frequency resources.

In this implementation, the indication information is generated according to the second time-frequency resources. The information of the second time-frequency resources can be identified by the terminal according to the indication information. When decoding data, the terminal only needs to decode the data transmitted in the resources in the first time-frequency resources other than the second time-frequency resources, and needs not to decode data transmitted in the second time-frequency resources, thereby improving the efficiency and accuracy of data demodulation.

In an implementation, the base station sends radio resource control (RRC) signaling to the terminal, and the RRC signaling is used for instructing the terminal to acquire the indication information from one of control channels of N number of TTIs following a TTI of the first time-frequency resources and a symbol where a control channel of a TTI of the second time-frequency resources is located.

That is, the terminal can obtain information of the location of the indication information according to the RRC signaling, thereby improving the efficiency of acquiring the indication information and reducing the power consumption of the terminal.

In an implementation, a time-domain granularity of the indication information is in a mini-slot level or a symbol level. That is, the time-domain granularity of the indication information may be in the mini-slot level, and alternatively, the time-domain granularity of the indication information may be in the symbol level. Since the time-domain granularity in the mini-slot level is greater than the time domain granularity in the symbol level, such that the flexibility of data decoding is further improved and power consumption is reduced.

In an implementation, when the second time-frequency resources have a length greater than or equal to two symbols in time domain, the time-domain granularity of the indication information is in the mini-slot level. When the second time-frequency resources have a length equal to one symbol in the time domain, the time-domain granularity of the indication information is in the symbol level.

That is, when the second time-frequency resources are greater than or equal to two symbols in the time domain, the indication information is transmitted with the time-domain granularity in the mini-slot level. When the second time-frequency resources have a length equal to one symbol in the time domain, the indication information is transmitted with the time-domain granularity in the symbol level. Since the time-domain granularity in the mini-slot level is greater than the time domain granularity in the symbol level, such that the flexibility of data decoding is further improved and power consumption is reduced.

At S204, the base station sends the indication information to the terminal.

The base station sends the indication information for indicating the second time-frequency resources to the terminal. Since the indication information includes the information of the second time-frequency resources, the terminal only needs to decode the data transmitted in the resources in the first time-frequency resources other than the second time-frequency resources, and needs not to decode data transmitted in the second time-frequency resources, thereby improving the efficiency and accuracy of data demodulation.

In an implementation, the base station can configure the indication information in the symbol where the control channel of the transmission time interval (TTI) of the second time-frequency resources is located, and sends the indication information to the terminal by carrying the indication information into the downlink control information (DCI). The base station can also configure the indication information in the control channels of the N number of the TTIs following the TTI of the first time-frequency resources, and sends the indication information over one of a new radio physical downlink control channel (NR-PDCCH) and a group common physical downlink control channel (GC-PDCCH), and N is an integer greater than or equal to one.

Figure 4:
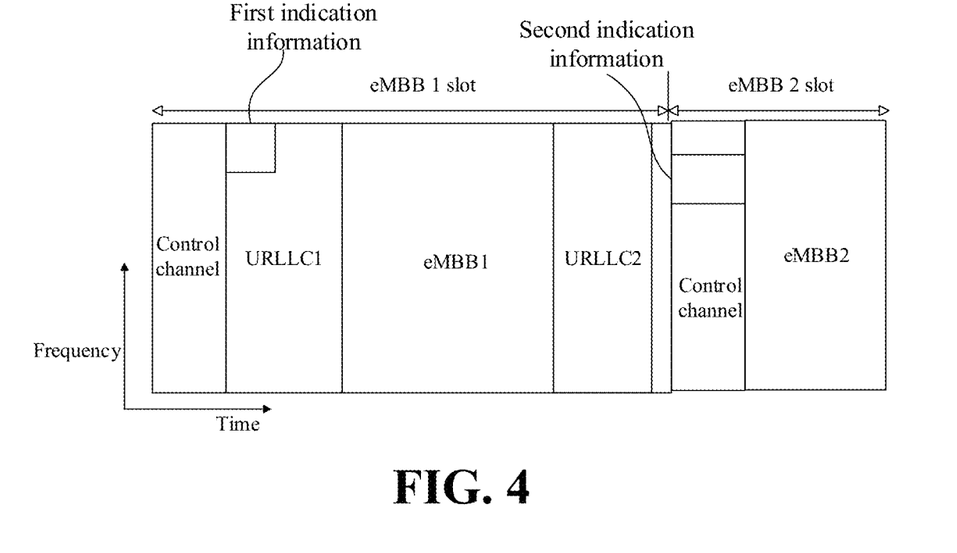
FIG. 4 is a schematic diagram of different indication information with different positions according to an embodiment of the present disclosure.

FIG. 4 illustrates possible locations of the indication information, and the indication information sent by the base station to the terminal may be first indication information or second indication information illustrated in FIG. 4. The first indication information is located in a symbol where a control channel of a TTI of the second time-frequency resources occupied by a URLLC1 service is located, and is used for indicating information of time-frequency resources occupied by the URLLC1 service. The instruction information is sent to the terminal with the time-frequency resources allocated to the URLLC1, and the terminal can acquire the indication information before demodulating data transmitted in the time-frequency resources occupied by the URLLC1 service, such that the data transmitted in the time-frequency resources occupied by the URLLC1 service needs not to be demodulated, thereby improving the efficiency and accuracy of data demodulation. The second indication information is located in a control channel of a TTI of a next eMBB service and is used for indicating information of time-frequency resources occupied by a URLLC2 service. That is, the second indication information is located in the control channels of N number of TTIs following the TTI of the first time-frequency resources, such that a problem that the second time-frequency resources fail to support issuing the indication information can be solved, and requirements of issuing the indication information by the second time-frequency resources can be eased. The terminal can decode data transmitted in the resources in the first time-frequency resources other than the second time-frequency resources according to the indication information, thereby improving the efficiency and accuracy of the data demodulation.

In an implementation, the location of the indication information may be determined by a service support capability of the terminal, a service level of a service performed by the terminal, and a ratio of resources occupied by the second time-frequency resources to resources occupied by the first time-frequency resources. In addition, other manners for determining the ratio may be included, which are not limited in the embodiments of the present disclosure.

In an implementation, when the terminal supports services of the other terminals, the base station sends the indication information over one of the symbol where the control channel of the TTI of the second time-frequency resources is located and the control channels of the N number of TTIs following the TTI of the first time-frequency resources. When the terminal fails to support the services of the other terminals, the base station sends the indication information over the control channels of the N number of TTIs following the TTI of the first time-frequency resources.

The terminal necessarily supports the service of the terminal. When the terminal supports the services of the other terminals, the indication information is transmitted to the terminal through the DCI or multiplexing one of the NR-PDCCH and the PDCCH, and the terminal acquires the indication information over the symbol where the control channel of the TTI of the second time-frequency resources is located or over the control channels of N numbers of TTIs following the TTI of the first time-frequency resources. When the terminal fails to support the services of the other terminals, the indication information can only be transmitted to the terminal by multiplexing the NR-PDCCH or the PDCCH, and the terminal acquires the indication information at the N number of TTIs following the TTI of the first time-frequency resources.

In an implementation, when a service level of a service performed by the terminal is greater than or equal to a level threshold, the base station sends the indication information over the symbol where the control channel of the TTI of the second time-frequency resources is located. When the service level of the service performed by the terminal is less than the level threshold, the base station sends the indication information over one of the symbol where the control channel of the TTI of the second time-frequency resources is located and the control channels of the last N number of TTIs of the first time-frequency resources.

In this implementation, a factor for determining the service level at least includes a delay requirement of performing the service by the terminal. The service level is determined according to the delay requirement of performing the service by the terminal, and the higher the delay requirement of the service, the higher the service level of the service. In addition, other factors for determining the service level may be included, and the factor for determining the service level is not limited in the present disclosure.

That is, when the service level of the service performed by the terminal is greater than or equal to the level threshold, in order to improve the efficiency and accuracy of data demodulation, the indication information is transmitted to the terminal through the DCI, and the terminal acquires the indication information over the symbol where the control channel of the TTI of the second time-frequency resources is located. When the service level is lower than the level threshold, the indication information may be transmitted to the terminal through the DCI or by multiplexing one of the NR-PDCCH and the PDCCH, and the terminal acquires the indication information on the control channels of the last N number of TTIs of the first time-frequency resources.

It is noted that this embodiment does not limit services performed by the terminal and other terminals. In an embodiment, the terminal performs the eMBB services, and the other terminals perform the URLLC services. That is, the service level of the service performed by the terminal is the service level of the eMBB service.

In an implementation, a ratio of resources occupied by the second time-frequency resources to resources occupied by the first time-frequency resources is determined. When the ratio is less than or equal to an occupancy threshold, the base station sends the indication information over one of the symbol where the control channel of the TTI of the second time-frequency resources is located and the control channels of the last N number of TTIs of the first time-frequency resources. When the ratio is greater than the occupancy threshold, the base station sends the indication information over the control channels of the last N number of TTIs of the first time-frequency resources.

The second time-frequency resources are occupied by one or more other terminals, and there is no influence on data demodulation with or without the indication information. That is, assume the occupancy threshold is K, and when the ratio is greater than K, the indication information may be obtained on the control channels of the N numbers pf TTIs following the TTI of the first time-frequency resources. When the ratio is less than K, the indication information may be obtained on the symbol where the control channel of the TTI of the second time-frequency resources is located or the control channels of the N number of TTIs following the TTI of the first time-frequency resources, thereby improving the efficiency and accuracy of data demodulation.

In this embodiment, the indication information may be in the symbol where the control channel of the TTI of the second time-frequency resources is located, or in the control channels of the N number of the TTIs following the TTI of the first time-frequency resources. That is, when the terminal receives the control signaling and the data sent by the base station, the terminal first needs to monitor a location of the indication information that may appear in the control channel, and then obtains the indication information after the location of the indication information is determined.

Figure 5:
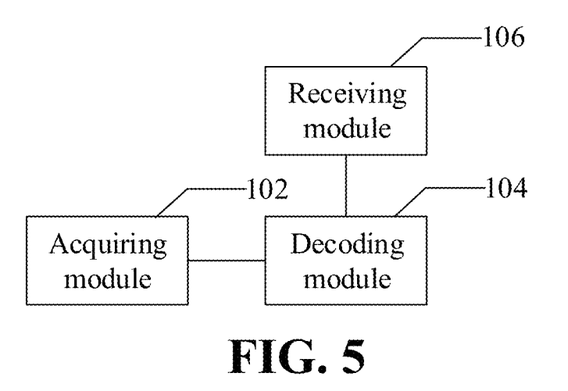
FIG. 5 is a schematic structural diagram of a device for processing data according to an embodiment of the present disclosure.

According to a third aspect of the present disclosure, a device for processing data is provided. As illustrated in FIG. 5, the device for processing data includes an acquiring module 102 and a decoding module 104. The acquiring module 102 is configured to acquire indication information sent by a base station, the indication information is indicative of information of second time-frequency resources, and the second time-frequency resources are part of first time-frequency resources scheduled to a terminal and are allocated by the base station to other terminals. The decoding module 104 is configured to decode data transmitted in resources in the first time-frequency resources other than the second time-frequency resources according to the indication information.

In an implementation, when the indication information is located in a symbol where a control channel of a transmission time interval (TTI) of the second time-frequency resources is located, the acquiring module 102 is configured to acquire the indication information from the symbol where the control channel of the TTI of the second time-frequency resources is located. When the indication information is located in control channels of N number of TTIs following a TTI of the first time-frequency resources, the acquiring module 102 is configured to acquire the indication information from the control channels of the N number of TTIs following the TTI of the first time-frequency resources, and N is an integer greater than or equal to one.

In an implementation, the device for processing data further includes a receiving module 106. The receiving module 106 is configured to receive radio resource control (RRC) signaling sent by the base station, and the RRC signaling is used for instructing the terminal to acquire the indication information from one of control channels of N numbers of TTIs following a TTI the first time-frequency resources and a symbol where a control channel of a TTI of the second time-frequency resources is located.

In an implementation, a level of a time-domain granularity of the indication information includes a mini-slot level and a symbol level.

In an implementation, the time-domain granularity of the indication information is in the mini-slot level when the second time-frequency resources has a length greater than or equal to two symbols in time domain, and the time-domain granularity of the indication information is in the symbol level when the second time-frequency resources has a length equal to one symbol in the time domain.

Figure 6:
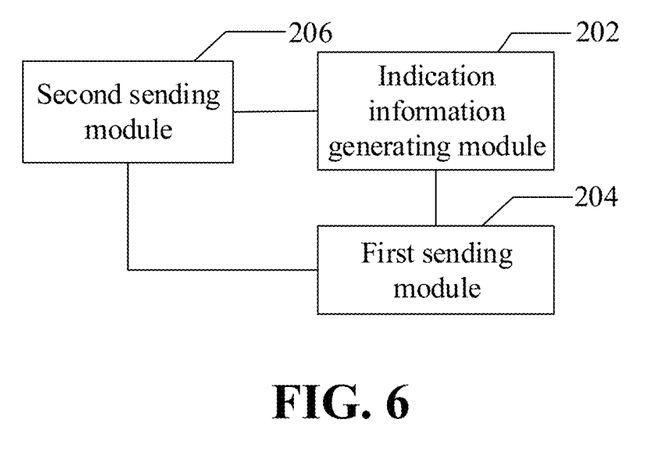
FIG. 6 is a schematic structural diagram of a device for processing data according to another embodiment of the present disclosure.

According to a fourth aspect of the present disclosure, a device for processing data is provided. As illustrated in FIG. 6, the device for processing data includes an indication information generating module 202 and a first sending module 204. The indication information generating module 202 is configured to allocate second time-frequency resources which are part of first time-frequency resources scheduled to a terminal to other terminals, and to generate indication information according to the second time-frequency resources, and the indication information is used for instructing the terminal to identify information of the second time-frequency resources. The first sending module 204 is configured to send the indication information to the terminal.

In an implementation, when the indication information is located in a symbol where a control channel of a transmission time interval (TTI) of the second time-frequency resources is located, the first sending module 204 is configured to carry the indication information into downlink control information (DCI) and to send the indication information to the terminal. When the indication information is located in control channels of N number of TTIs following a TTI of the first time-frequency resources, the first sending module 204 is configured to send the indication information to the terminal over one of a new radio interface physical downlink control channel (NR-PDCCH) and a group common downlink control channel group common (GC-PDCCH), and N is an integer greater than or equal to one.

In an implementation, the device for processing data further a second sending module 206.

The second sending module 206 is configured to send radio resource control (RRC) signaling to the terminal, and the RRC signaling is used for instructing the terminal to acquire the indication information from one of control channels of N number of TTIs following a TTI of the first time-frequency resources and a symbol where a control channel of a TTI of the second time-frequency resources is located.

In an implementation, when the terminal supports services of the other terminals, the first sending module 204 is configured to send the indication information over one of the symbol where the control channel of the TTI of the second time-frequency resources is located and the control channels of the N number of TTIs following the TTI of the first time-frequency resources. When the terminal fails to support the services of the other terminals, the first sending module 204 is configured to send the indication information over the control channels of the N number of TTIs following the TTI of the first time-frequency resources.

In an implementation, when a service level of a service performed by the terminal is greater than or equal to a level threshold, the first sending module 204 is configured to send the indication information over the symbol where the control channel of the TTI of the second time-frequency resources is located, and when the service level of the service performed by the terminal is less than the level threshold, the first sending module 204 is configured to send the indication information over one of the symbol where the control channel of the TTI of the second time-frequency resources is located and the control channels of the last N number of TTIs of the first time-frequency resources. A factor for determining the service level at least includes a delay requirement of performing the service by the terminal.

In an implementation, the first sending module 204 is configured to determine a ratio of resources occupied by the second time-frequency resources to resources occupied by the first time-frequency resources. When the ratio is less than or equal to an occupancy threshold, the first sending module 204 is configured to send the indication information over one of the symbol where the control channel of the TTI of the second time-frequency resources is located and the control channels of the N number of TTIs following the TTI of the first time-frequency resources. When the ratio is greater than the occupied threshold, the first sending module 204 is configured to send the indication information over the control channels of the N number of TTIs following the TTI of the first time-frequency resources.

According to a fifth aspect of the present disclosure, a system for processing data is provided. The system for processing data includes devices for processing data according to the first aspect and the second aspect of the present disclosure.

Figure 7:
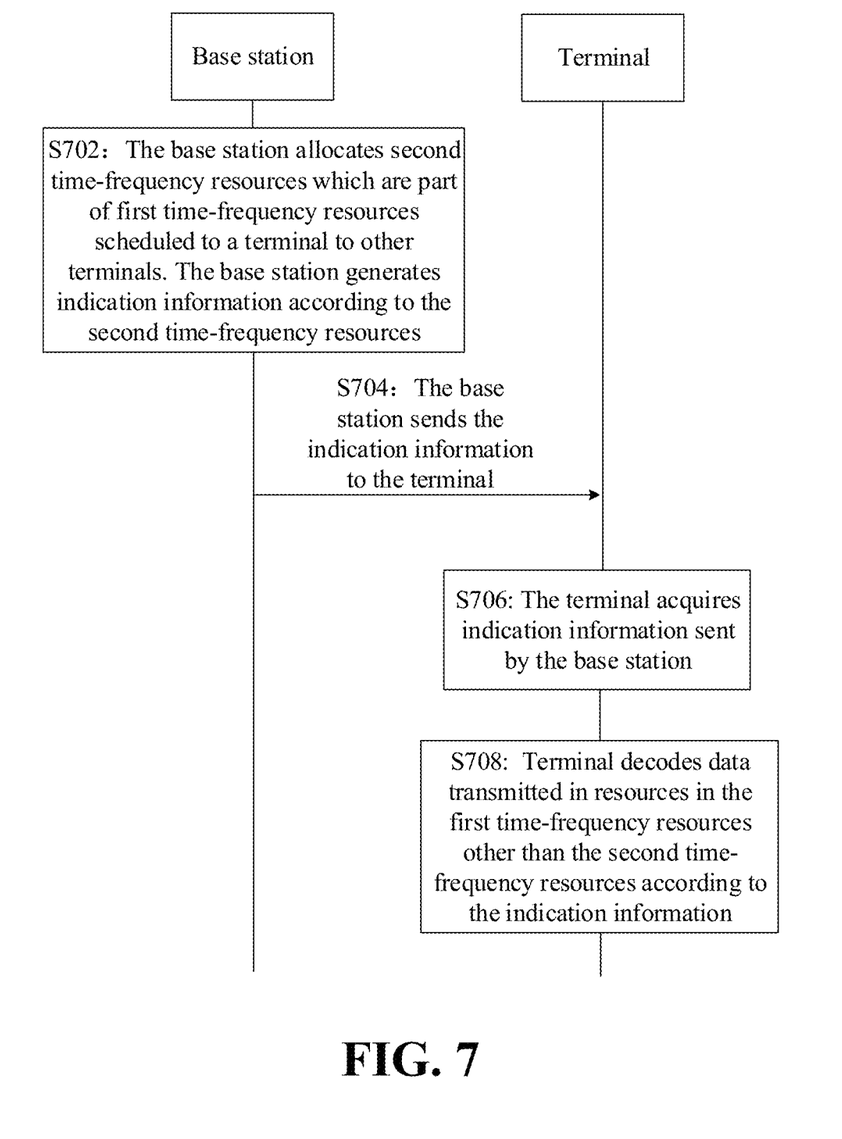
FIG. 7 is a timing diagram of a system for processing data according to an embodiment of the present disclosure.

FIG. 7 illustrates a timing diagram of the system for processing data, which starts with the operations at S702.

At S702, a base station allocates second time-frequency resources which are part of first time-frequency resources scheduled to a terminal to other terminals. The base station generates indication information according to the second time-frequency resources.

In this implementation, the second time-frequency resources are part of first time-frequency resources scheduled to the terminal and are allocated by the base station to other terminals. That is, in order to satisfy the multi-service multiplexing, the base station allocates part of the first time-frequency resources scheduled to the terminal to the other terminals and to be the second time-frequency resources.

In this implementation, the indication information is generated according to the second time-frequency resources.

The information of the second time-frequency resources can be identified by the terminal according to the indication information. When decoding data, the terminal only needs to decode the data transmitted in the resources in the first time-frequency resources other than the second time-frequency resources, and needs not to decode data transmitted in the second time-frequency resources, thereby improving the efficiency and accuracy of data demodulation.

At S704, the base station sends the indication information to the terminal.

In an implementation, when the indication information is located in a symbol where a control channel of a transmission time interval (TTI) of the second time-frequency resources is located, the base station carries the indication information into downlink control information (DCI) and sends the indication information to the terminal. When the indication information is located in control channels of N number of TTIs following a TTI of the first time-frequency resources, the base station transmits the indication information over one of a new radio interface physical downlink control channel (NR-PDCCH) and a group common downlink control channel group common (GC-PDCCH), and N is an integer greater than or equal to one.

In an implementation, the location of the indication information may be determined by a service support capability of the terminal, a service level of a service performed by the terminal, and a ratio of resources occupied by the second time-frequency resources to resources occupied by the first time-frequency resources. In addition, other manners for determining the ratio may be included, which are not limited in the embodiments of the present disclosure.

In an implementation, when the terminal supports services of the other terminals, the base station sends the indication information over one of the symbol where the control channel of the TTI of the second time-frequency resources is located and the control channels of the N number of TTIs following the TTI of the first time-frequency resources. When the terminal fails to support the services of the other terminals, the base station sends the indication information over the control channels of the N number of TTIs following the TTI of the first time-frequency resources.

The terminal necessarily supports the service of the terminal. When the terminal supports the services of the other terminals, the indication information is transmitted to the terminal through the DCI or multiplexing one of the NR-PDCCH and the PDCCH, and the terminal acquires the indication information over the symbol where the control channel of the TTI of the second time-frequency resources is located or over the control channels of N numbers of TTIs following the TTI of the first time-frequency resources. When the terminal fails to support the services of the other terminals, the indication information can only be transmitted to the terminal by multiplexing the NR-PDCCH or the PDCCH, and the terminal acquires the indication information at the N number of TTIs following the TTI of the first time-frequency resources.

In an implementation, when a service level of a service performed by the terminal is greater than or equal to a level threshold, the base station sends the indication information over the symbol where the control channel of the TTI of the second time-frequency resources is located. When the service level of the service performed by the terminal is less than the level threshold, the base station sends the indication information over one of the symbol where the control channel of the TTI of the second time-frequency resources is located and the control channels of the last N number of TTIs of the first time-frequency resources.

In this implementation, a factor for determining the service level at least includes a delay requirement of performing the service by the terminal. The service level is determined according to the delay requirement of performing the service by the terminal, and the higher the delay requirement of the service, the higher the service level of the service. In addition, other factors for determining the service level may be included, and the factor for determining the service level is not limited in the present disclosure.

That is, when the service level of the service performed by the terminal is greater than or equal to the level threshold, in order to improve the efficiency and accuracy of data demodulation, the indication information is transmitted to the terminal through the DCI, and the terminal acquires the indication information over the symbol where the control channel of the TTI of the second time-frequency resources is located. When the service level is lower than the level threshold, the indication information may be transmitted to the terminal through the DCI or by multiplexing one of the NR-PDCCH and the PDCCH, and the terminal acquires the indication information on the control channels of the last N number of TTIs of the first time-frequency resources.

It is noted that this embodiment does not limit services performed by the terminal and other terminals. In an embodiment, the terminal performs the eMBB services, and the other terminals perform the URLLC services. That is, the service level of the service performed by the terminal is the service level of the eMBB service.

In an implementation, a ratio of resources occupied by the second time-frequency resources to resources occupied by the first time-frequency resources is determined. When the ratio is less than or equal to an occupancy threshold, the base station sends the indication information over one of the symbol where the control channel of the TTI of the second time-frequency resources is located and the control channels of the N number of TTIs following the TTI of the first time-frequency resources. When the ratio is greater than the occupancy threshold, the base station sends the indication information over the control channels of the N number of TTIs following the TTI of the first time-frequency resources.

The second time-frequency resources are occupied by one or more other terminals, and there is no influence on data demodulation with or without the indication information. That is, assume the occupancy threshold is K, and when the ratio is greater than K, the indication information may be obtained on the control channels of the N numbers pf TTIs following the TTI of the first time-frequency resources. When the ratio is less than K, the indication information may be obtained on the symbol where the control channel of the TTI of the second time-frequency resources is located or the control channels of the N number of TTIs following the TTI of the first time-frequency resources, thereby improving the efficiency and accuracy of data demodulation.

In this embodiment, the indication information may be in the symbol where the control channel of the TTI of the second time-frequency resources is located, or in the control channels of the N number of the TTIs following the TTI of the first time-frequency resources. That is, when the terminal receives the control signaling and the data sent by the base station, the terminal first needs to monitor a location of the indication information that may appear in the control channel, and then obtains the indication information after the location of the indication information is determined.

In an implementation, the base station sends radio resource control (RRC) signaling to the terminal, and the RRC signaling is used for instructing the terminal to acquire the indication information from one of control channels of N number of TTIs following a TTI of the first time-frequency resources and a symbol where a control channel of a TTI of the second time-frequency resources is located.

That is, the terminal can obtain information of the location of the indication information according to the RRC signaling, thereby improving the efficiency of acquiring the indication information and reducing the power consumption of the terminal.

In an implementation, a time-domain granularity of the indication information is in a mini-slot level or a symbol level. That is, the time-domain granularity of the indication information may be in the mini-slot level, and alternatively, the time-domain granularity of the indication information may be in the symbol level. Since the time-domain granularity in the mini-slot level is greater than the time domain granularity in the symbol level, such that the flexibility of data decoding is further improved and power consumption is reduced.

In an implementation, when the second time-frequency resources have a length greater than or equal to two symbols in time domain, the time-domain granularity of the indication information is in the mini-slot level. When the second time-frequency resources have a length equal to one symbol in the time domain, the time-domain granularity of the indication information is in the symbol level.

That is, when the second time-frequency resources are greater than or equal to two symbols in the time domain, the indication information is transmitted with the time-domain granularity in the mini-slot level. When the second time-frequency resources have a length equal to one symbol in the time domain, the indication information is transmitted with the time-domain granularity in the symbol level. Since the time-domain granularity in the mini-slot level is greater than the time domain granularity in the symbol level, such that the flexibility of data decoding is further improved and power consumption is reduced.

For example, assume the TTI includes 7 symbols, and control information occupies one symbol. When the indication information is transmitted in the symbol level, 6 bits are occupied to be used for indicating, and a feedback character "0" means it is not adopted and a feedback character "1" means it is adopted. When the second time-frequency resources are two symbols in the time domain, the indication information is transmitted with the time domain granularity in the mini-slot level, and 5 bits are occupied to be used for indicating, thereby reducing signaling overhead.

At S706, the terminal acquires indication information sent by the base station.

In this implementation, the indication information may be located in the symbol where the control channel of the TTI of the second time-frequency resources is located, or in the control channels of the N number of TTIs following the TTI of the first time-frequency resources. That is, when the terminal receives control signaling and data sent by the base station, the terminal first needs to monitor a location of the indication information that may appear in the control channel, and then obtains the indication information after the location of the indication information is determined.

In an implementation, before the terminal acquires the indication information sent by the base station, the following is further carried out. The terminal receives radio resource control (RRC) signaling sent by the base station, and the RRC signaling is used for instructing the terminal to acquire the indication information from one of control channels of N number of TTIs following a TTI of the first time-frequency resources and a symbol where a control channel of a TTI of the second time-frequency resources is located.

That is, the terminal can obtain information of the location of the indication information according to the RRC signaling, thereby improving the efficiency of acquiring the indication information and reducing the power consumption of the terminal.

At S708, the terminal decodes data transmitted in resources in the first time-frequency resources other than the second time-frequency resources according to the indication information.

This implementation does not limit specific data decoding processes.

The base station sends the indication information for indicating the second time-frequency resources to the terminal. Since the indication information includes the information of the second time-frequency resources, the terminal only needs to decode the data transmitted in the resources in the first time-frequency resources other than the second time-frequency resources, and needs not to decode data transmitted in the second time-frequency resources, thereby improving the efficiency and accuracy of data demodulation.

Beneficial effects of the embodiments of the present disclosure are described as follows. According to the method and the device for processing data as described above, when the terminal acquires the indication information sent by the base station, the terminal decodes data transmitted in resources in the first time-frequency resources other than the second time-frequency resources according to the indication information. The second time-frequency resources are part of first time-frequency resources scheduled to the terminal and are allocated by the base station to other terminals. That is, the terminal only decodes data for the terminal without decoding data for the other terminals, thereby improving the efficiency and accuracy of data demodulation.

Figure 8:
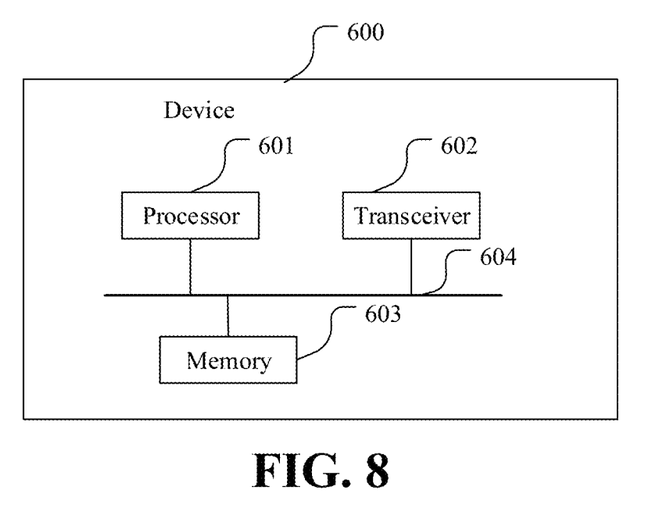
FIG. 8 is a schematic structural diagram of a computer device configured to run a method for processing data according to an embodiment of the present disclosure.

Referring to FIG. 8, a device 600 is further provided according to an embodiment of the present disclosure. The device 600 includes, but not limited to: a smart phone, a smart watch, a tablet, a personal computer, a laptop, or a computer group. As illustrated in FIG. 8, the device 600 includes a processor 601, a memory 603, a transceiver 602, and a bus 604. The transceiver 602 is configured to transmit and receive data with and from external devices. One or more processors 601 may be provided in the device 600. In some embodiments of the present disclosure, the processor 601, the memory 603, and the transceiver 602 may be coupled by a bus system or other means. The device 600 can be used to perform the methods illustrated in FIGS. 2 and 3. For the meanings and examples of the terms involved in the embodiment, reference can be made to the corresponding descriptions of FIGS. 2-3, and details are not described herein.

Program codes are stored in the memory 603. The processor 601 is configured to call the program codes stored in the memory 603 for performing operations illustrated in FIGS. 2-3.

It is noted that the processor 601 herein may be a processing element or a general term of multiple processing elements. For example, the processing element may be a central processing unit (CPU) or an application specific integrated circuit (ASIC), or one or more integrated circuits (for example, one or more digital signal processors (DSPs), or one or more field programmable gate arrays (FPGAs)) configured to implement the embodiments of the present disclosure.

The memory 603 may be a storage device or a general term of multiple storage elements, and is configured to store executable program codes, application programs, or parameters, data, etc. required for operating the device 600. The memory 603 may include a random access memory (RAM), and may also include a non-volatile memory such as a magnetic disk memory, a flash memory, or the like.

The bus 604 may be an industry standard architecture (ISA) bus, a peripheral component (PCI) bus, an extended industry standard architecture (EISA) bus, or the like. The bus may include an address bus, a data bus, a control bus, and the like. For ease of representation, only one bold line is illustrated to indicate the bus in FIG. 8, but it does not mean that there is only one bus or one type of bus.

The device may also include an input/output (I/O) device coupled to the bus 604, such that the I/O device can be coupled to other elements such as the processor 601 via the bus 604. The I/O device can provide an input interface for an operator, such that the operator can select a control item through the input interface. The I/O device can also be other interfaces through which other devices can be externally connected.

In the above embodiments, it may be implemented in whole or in part by software, hardware, firmware, or any combination thereof. When implemented using a software program, it may be implemented in whole or in part in the form of a computer program product. The computer program product includes one or more computer instructions. When computer program instructions are loaded and executed on a computer, the processes or functions in accordance with embodiments of the present invention are generated in whole or in part. The computer can be a general-purpose computer, a special-purpose computer, a computer network, or other programmable device. The computer instructions can be stored in a computer readable storage medium or transferred from one computer readable storage medium to another computer readable storage medium. For example, the computer instructions can be transmitted from a website site, a computer, a server, or a data center to another website site, another computer, another server, or another data center via a wired (e.g., coaxial cable, fiber optic, digital subscriber line (DSL), or wireless mean (e.g., infrared, wireless, microwave, etc.). The computer readable storage medium can be any available media capable of being accessed by a computer or a data storage device such as a server, a data center, or the like that includes one or more available media. The available media can be magnetic media (e.g., floppy disk, hard disk, magnetic tape), optical media (e.g., DVD), or semiconductor media (e.g., solid state disk (SSD)).

The above-described embodiments are merely preferred embodiments of the present disclosure, which are not intended to limit the protection scope of the present disclosure. Accordingly, any equivalent variants in accordance with the claims should fall within the scope of the present disclosure.

What is claimed is:

1. A method for processing data, comprising:
   receiving, by a terminal, radio resource control (RRC) signaling sent by a base station, wherein the RRC signaling is used for instructing the terminal to acquire indication information from one of a symbol where a control channel of a transmission time interval (TTI) of a second time-frequency resource is located or control channels of a last N number of TTIs of first time-frequency resources;
   acquiring, by the terminal, the indication information sent by the base station from the one of the symbol where the control channel of a transmission time interval (TTI) of the second time-frequency resource is located or the control channels of the last N number of the TTIs of the first time-frequency resources, wherein the indication information is indicative of information of the second time-frequency resource in the first time-frequency resources scheduled to the terminal to other terminals; and
   decoding, by the terminal, data transmitted in resources in the first time-frequency resources other than the second time-frequency resource according to the indication information,
   wherein when a service level of a service performed by the terminal is greater than or equal to a level threshold, the indication information is sent by the base station through the symbol where the control channel of the TTI of the second time-frequency resource is located,
   wherein when the service level of the service performed by the terminal is less than the level threshold, the indication information is sent by the base station through the one of the symbol where the control channel of the TTI of the second time-frequency resource is located or the control channels of the last N number of the TTIs of the first time-frequency resources, and
   wherein a factor for determining the service level comprises a delay requirement for the service to be performed by the terminal.

2. The method of claim 1, wherein
   when the indication information is located in the symbol where the control channel of the TTI of the second time-frequency resource is located, acquiring, by the terminal, the indication information sent by the base station comprises:
     acquiring, by the terminal, the indication information from the symbol where the control channel of the TTI of the second time-frequency resource is located; and
   when the indication information is located in the control channels of the last N number of the TTIs of the first time-frequency resources, acquiring, by the terminal, the indication information sent by the base station comprises:
     acquiring, by the terminal, the indication information from the control channels of the last N number of the TTIs of the first time-frequency resources, wherein N is an integer greater than or equal to one.

3. The method of claim 1, wherein a time-domain granularity of the indication information is in a mini-slot level or a symbol level.

4. The method of claim 3, wherein
   the time-domain granularity of the indication information is in the mini-slot level when the second time-frequency resource has a length greater than or equal to two symbols in time domain; and
   the time-domain granularity of the indication information is in the symbol level when the second time-frequency resource has a length equal to one symbol in the time domain.

5. A method for processing data, comprising:
   allocating, by a base station, a second time-frequency resource in first time-frequency resources scheduled to a terminal to other terminals;
   generating, by the base station, indication information according to the second time-frequency resource, wherein the indication information is used for instructing the terminal to identify information of the second time-frequency resource;
   when a service level of a service performed by the terminal is greater than or equal to a level threshold, sending, by the base station, the indication information through a symbol where a control channel of a transmission time interval (TTI) of the second time-frequency resource is located;
when the service level of the service performed by the terminal is less than the level threshold, sending, by the base station, the indication information to the terminal through one of the symbol where the control channel of the TTI of the second time-frequency resource is located or control channels of a last N number of TTIs of the first time-frequency resources; and
sending, by the base station, radio resource control (RRC) signaling to the terminal, wherein the RRC signaling is used for instructing the terminal to acquire the indication information from the one of the symbol where the control channel of the TTI of the second time-frequency resource is located or the control channels of the last N number of the TTIs of the first time-frequency resources,
wherein a factor for determining the service level comprises a delay requirement of the service performed by the terminal.

6. The method of claim 5, wherein
when the indication information is located in the symbol where the control channel of the TTI of the second time-frequency resource is located, sending, by the base station, the indication information to the terminal comprises:
  sending the indication information to the terminal by carrying the indication information into downlink control information (DCI); and
when the indication information is located in the control channels of the last N number of the TTIs of the first time-frequency resources and N is an integer greater than or equal to one, sending, by the base station, the indication information to the terminal comprises:
  sending the indication information over one of a new radio physical downlink control channel (NR-PDCCH) or a group common physical downlink control channel (GC-PDCCH).

7. The method of claim 6, wherein sending, by the base station, the indication information to the terminal comprises:
when the terminal supports services of the other terminals, sending, by the base station, the indication information over the one of the symbol where the control channel of the TTI of the second time-frequency resource is located or the control channels of the last N number of the TTIs of the first time-frequency resources; and
when the terminal fails to support the services of the other terminals, sending, by the base station, the indication information over the control channels of the last N number of the TTIs of the first time-frequency resources.

8. The method of claim 6, wherein sending, by the base station, the indication information to the terminal comprises:
determining a ratio of resources occupied by the second time-frequency resource to resources occupied by the first time-frequency resources;
when the ratio is less than or equal to an occupancy threshold, sending, by the base station, the indication information over one of the symbol where the control channel of the TTI of the second time-frequency resource is located or the control channels of the last N number of the TTIs of the first time-frequency resources; and
when the ratio is greater than the occupancy threshold, sending, by the base station, the indication information over the control channels of the last N number of the TTIs of the first time-frequency resources.

9. A device for processing data, comprising:
at least one processor; and
a computer readable storage, coupled with the at least one processor and storing at least one computer executable instruction therein which, when executed by the at least one processor, causes the at least one processor to:
  receive radio resource control (RRC) signaling sent by a base station, wherein the RRC signaling is used for instructing a terminal to acquire indication information from one of a symbol where a control channel of a transmission time interval (TTI) of a second time-frequency resource is located or control channels of a last N number of TTIs of first time-frequency resources;
  acquire indication information sent by the base station from the symbol where the control channel of the TTI of the second time-frequency resource is located or the control channels of the last N number of the TTIs of the first time-frequency resources, wherein the indication information is indicative of information of the second time-frequency resource in the first time-frequency resources scheduled to the terminal to other terminals; and
  decode data transmitted in resources in the first time-frequency resources other than the second time-frequency resource according to the indication information,
  wherein when a service level of a service performed by the terminal is greater than or equal to a level threshold, the indication information is sent by the base station through the symbol where the control channel of the TTI of the second time-frequency resource is located,
  wherein when the service level of the service performed by the terminal is less than the level threshold, the indication information is sent by the base station through the one of the symbol where the control channel of the TTI of the second time-frequency resource is located or the control channels of the last N number of the TTIs of the first time-frequency resources, and
  wherein a factor for determining the service level comprises a delay requirement for the service to be performed by the terminal.

10. The device of claim 9, wherein
when the indication information is located in the symbol where the control channel of the TTI of the second time-frequency resource is located, the at least one processor is configured to acquire the indication information from the symbol where the control channel of the TTI of the second time-frequency resource is located; and
when the indication information is located in the control channels of the last N number of the TTIs of the first time-frequency resources, the at least one processor is configured to acquire the indication information from the control channels of the last N number of the TTIs of the first time-frequency resources, and wherein N is an integer greater than or equal to one.

11. The device of claim 9, wherein a level of a time-domain granularity of the indication information comprises a mini-slot level and a symbol level.

12. The device of claim 11, wherein
the time-domain granularity of the indication information is in the mini-slot level when the second time-frequency resource has a length greater than or equal to two symbols in time domain; and the time-domain granularity of the indication information is in the symbol level when the second time-frequency resource has a length equal to one symbol in the time domain.

13. A device for processing data, comprising:

at least one processor; and a computer readable storage, coupled with the at least one processor and storing at least one computer executable instruction therein which, when executed by the at least one processor, causes the at least one processor to:

allocate a second time-frequency resource in first time-frequency resources scheduled to a terminal to other terminals;

generate indication information according to the second time-frequency resource, wherein the indication information is used for instructing the terminal to identify information of the second time-frequency resource;

when a service level of a service performed by the terminal is greater than or equal to a level threshold, send the indication information to the terminal through a symbol where a control channel of a transmission time interval (TTI) of the second time-frequency resource is located;

when the service level of the service performed by the terminal is less than the level threshold, send the indication information to the terminal through one of the symbol where the control channel of the TTI of the second time-frequency resource is located or control channels of a last N number of TTIs of the first time-frequency resources; and send radio resource control (RRC) signaling to the terminal, wherein the RRC signaling is used for instructing the terminal to acquire the indication information from the one of the control channels of the last N number of the TTIs of the first time-frequency resources or the symbol where the control channel of the TTI of the second time-frequency resource is located, wherein a factor for determining the service level comprises a delay requirement for the service to be per formed by the terminal.

14. The device of claim 13, wherein when the indication information is located in the symbol where the control channel of the TTI of the second time-frequency resource is located, the at least one processor is configured to carry the indication information into downlink control information (DCI) and to send the indication information to the terminal; and when the indication information is located in the control channels of the last N number of the TTIs of the first time-frequency resources and N is an integer greater than or equal to one, the at least one processor is configured to send the indication information to the terminal over one of a new radio interface physical downlink control channel (NR-PDCCH) or a group common downlink control channel group common (GC-PDCCH).

15. The device of claim 14, wherein the at least one processor is configured to:

when the terminal supports services of the other terminals, send the indication information over the one of the symbol where the control channel of the TTI of the second time-frequency resource is located or the control channels of the last N number of the TTs of the first time-frequency resources; and when the terminal fails to support the services of the other terminals, send the indication information over the control channels of the last N number of the TTs of the first time-frequency resources.

* * * * *